W. A. SCOTT.
RUG STIFFENER.
APPLICATION FILED FEB. 12, 1912.
1,030,685.
Patented June 25, 1912.
2 SHEETS—SHEET 1.
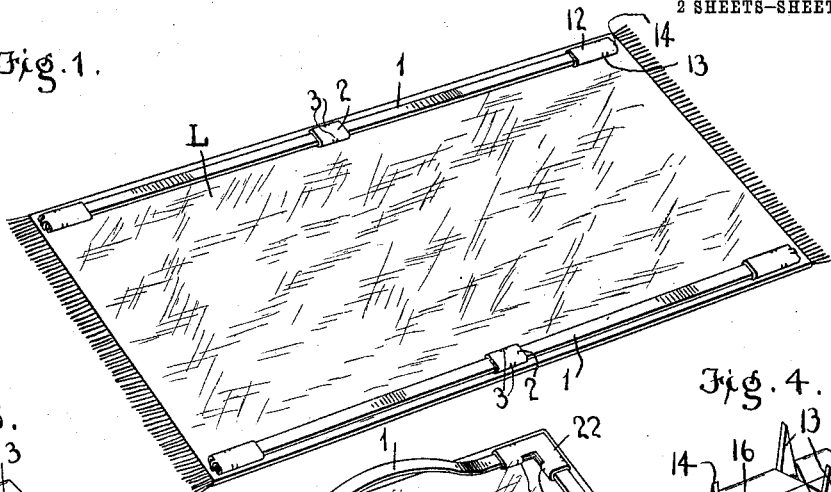
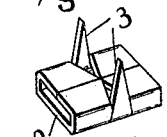
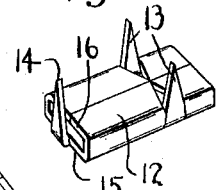
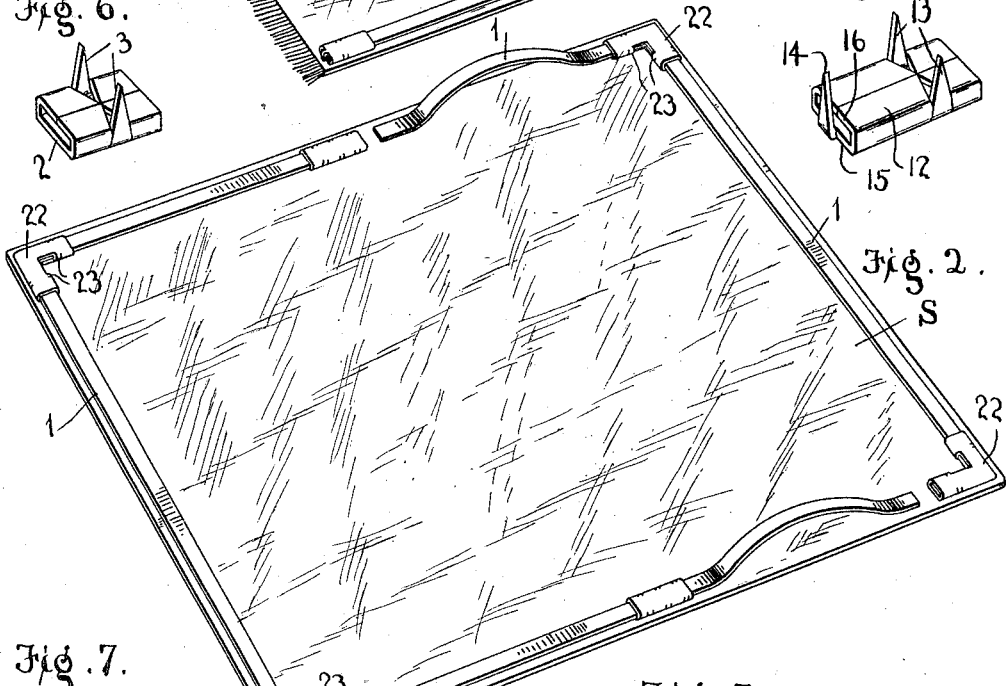
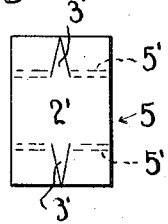
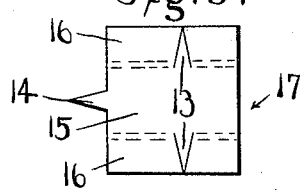
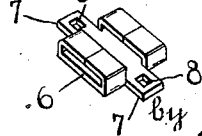
Witnesses
L. B. James
N. L. Callamer
Inventor
W. A. Scott
by H. B. Willson & Co.
Attorneys
COLUMBIA PLANOGRAPH CO., WASHINGTON, D. C.

W. A. SCOTT.
RUG STIFFENER.
APPLICATION FILED FEB. 12, 1912.
1,030,685.
Patented June 25, 1912.
2 SHEETS—SHEET 2.
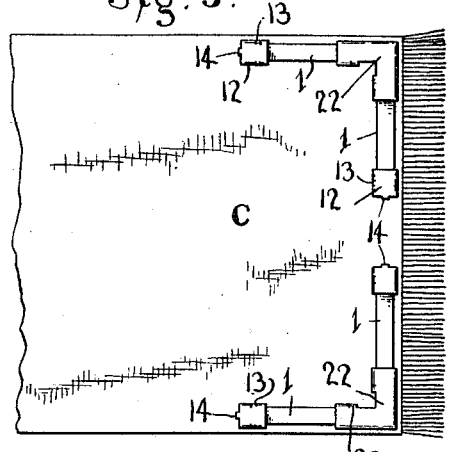
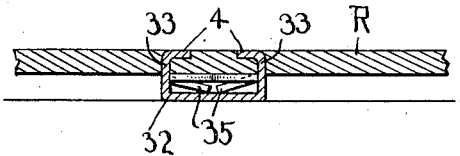
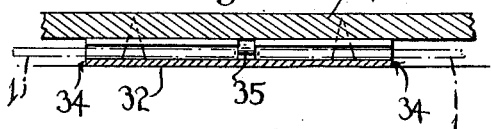
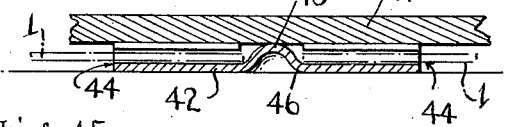
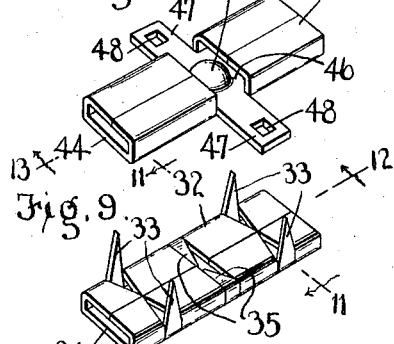
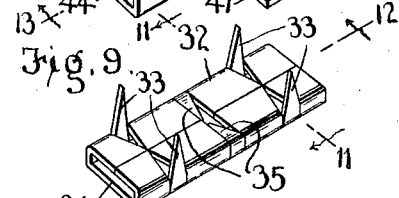
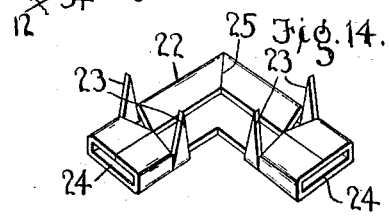
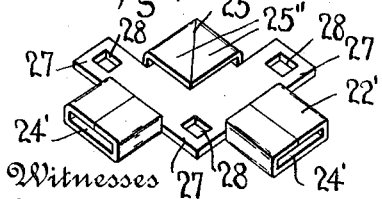
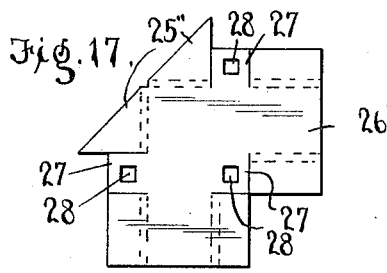
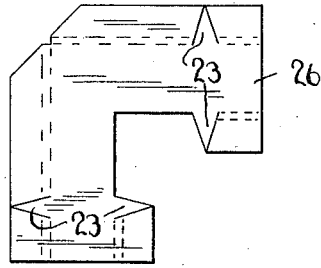
Witnesses
L. B. James
N. L. Collamer
Inventor
W. A. Scott
by H. B. Wilson & Co.
Attorneys

UNITED STATES PATENT OFFICE.

WALKER A. SCOTT, OF EVANSVILLE, INDIANA.

RUG-STIFFENER.

1,030,685. Specification of Letters Patent. Patented June 25, 1912.

Application filed February 12, 1912. Serial No. 677,179.

*To all whom it may concern:*

Be it known that I, WALKER A. SCOTT, a citizen of the United States. residing at Evansville, in the county of Vanderburg and State of Indiana, have invented certain new and useful Improvements in Rug-Stiffeners; and I do declare the following to be a full, clear, and exact description of the invention, such as will enable others skilled in the art to which it appertains to make and use the same.

This invention is a device intended for stiffening rugs such as are laid upon but not attached to the floor; and the object of the same is to produce a stiffener made up of a variety of members so that it is adapted for use in several ways. This and other objects are accomplished by the construction of parts hereinafter more fully described and claimed, and as shown in the drawings wherein—

Figure 1 is a perspective view of a small narrow rug inverted and stiffened along two edges. Fig. 2 is a similar view of a substantially square rug stiffened around its four sides. Fig. 3 is a similar view of two corners of a rug stiffened independently of each other. Fig. 4 is an enlarged perspective detail of the end socket having tang fasteners ready to be applied to the rug; and Fig. 5 is a plan view of the blank from which this form of my invention is produced. Fig. 6 is a perspective view of the through socket having tang fasteners; and Fig. 7 is a plan view of the blank from which this form of my invention is produced. Fig. 8 is a perspective view of the through socket having eye fasteners. Fig. 9 is a perspective detail of the double socket having tang fasteners, and Fig. 10 is a similar view of the same socket having eye fasteners. Figs. 11 and 12 are sectional views on the lines 11—11 and 12—12 respectively of Fig. 9, showing the double socket attached to a rug; and Fig. 13 is a similar section on the line 13—13 of Fig. 10 showing the double socket in the last-named view attached to a rug. Fig. 14 is an enlarged perspective view of the corner socket having tang fasteners, and Fig. 15 is a plan view of the blank from which this form of my invention is produced. Fig. 16 is a perspective view of the corner socket having eye fasteners, and Fig. 17 is a plan view of the blank from which this form of my invention is produced.

In the drawings the reference letters designate rugs, L being a small rug rather longer than it is wide, S being a substantially square rug, and C designating one end of any kind of a rug whose corners are to be treated. It is well known that rugs and carpets which are laid upon but not attached to floors more or less highly polished are apt to slip thereon, especially when some one steps upon a corner of the rug; and they are liable to become wrinkled and displaced, and their corners turned over and perhaps creased, especially when pushed up against pieces of furniture or the base board. My invention is one of that type of devices intended for stiffening a rug along its longer sides, at its corners, or possibly completely around it near its periphery, so that the objections above noted are avoided. A rug having a stiffener extending completely around it must retain its rectangular shape and cannot turn up or slip at one corner even though a person steps on it there or pushes an article of furniture against it there, for the rug must move as a whole and the area of its entire lower surface upon the floor affords considerable friction which resists the tendency to move, while yet permitting the intentional and forcible moving of the rug when the housewife desires. A rug stiffened even at its corners or along its longest side has many of these characteristics and advantages, and yet if the stiffeners along two opposite sides are omitted or are interrupted it is obvious that the rug can be rolled as when the housewife desires to remove it from the apartment for the purpose perhaps of cleaning or beating it out of doors. Thus it often occurs that, from the nature or shape of the rug itself or the surrounding conditions, it is not desirable to have the stiffener extend uninterruptedly around the entire rug, and my invention makes provision for this possibility. Broadly speaking, my improved stiffener comprises a set or series of socket members having suitable fastening devices by means of which they may be secured to the lower face of the rug, and stiff but flexible strips capable of being cut into lengths and their extremities inserted into the socket members which latter alone are attached to the rug. The parts are by preference all of metal, the sockets being stamped from pliable sheet metal and the strips being formed of light steel or other strap metal having sufficient stiffness and flexibility for the purposes herein.

Coming now to the details of the present invention, the numeral 1 designates simply a stiffening strip of the proper material, toughness, weight, and flexibility; and the same is to be cut into lengths which may be deflected upward as shown in Fig. 2 so that their extremities can be inserted into the socket members which are attached to the rug, while the strips themselves need not be attached thereto in any manner.

In Figs. 6, 7 and 8 are shown what I call the "through" sockets, because the strips are intended to pass through these members. The socket shown in Fig. 6 comprises a tubular body 2 considerably flattened as shown, and fastening devices consisting of tangs 3 integral with and struck up from said body as shown and constituting the fasteners for this socket because they are intended to be inserted into or through the rug R as seen in Fig. 11 and bent over at their points as at 4, which points will be hidden by the nap of the rug or perhaps buried completely in its material so that they will not be seen from the upper side. The blank 5 shown in Fig. 7 includes the body portion 2' and tangs 3' and is intended to be cut from a piece of pliable sheet metal in the shape shown and then bent on the lines 5' by any suitable means so that the finished socket presents the appearance illustrated in Fig. 6. The through socket shown in Fig. 8 has the same tubular body 6, but the fasteners in this instance are ears 7 stamped out of the material and pierced with eyes 8 which are secured beneath the rug by stitching them thereto in a manner well understood. Other forms of fasteners may be adopted without departing from the spirit of my invention. The strip 1 passes through this socket as seen at the center of the rug L in Fig. 1, and may of course be put into place or withdrawn therefrom at will.

The end socket illustrated in Figs. 4 and 5 has the same tubular body 12 and tangs 13 struck up from its sides and intended to engage the rug in the manner above described, but in this instance there is an additional tang 14 struck up from one end of the lower side 15 of the body and passing by the upper side 16 and into the rug, and this tang forms a stop at one end of the socket so that when the strip is inserted into the other end thereof and passed throughout the length of the body it comes up against the stop and can go no farther. The blank 17 from which this form of socket is made is shown in Fig. 5, and needs no further description in view of the description above of the blank shown in Fig. 7. This socket is shown in use at the four corners of the rug L in Fig. 1, and its obvious purpose is to receive the extremities of the strips 1 so that the latter after passing throughout the tubular body 12 come into contact with the end stop 14 and can go no farther.

The corner sockets best illustrated in Figs. 14 and 15 have right-angular tubular bodies 22 with tang fasteners 23 integral with and struck up from the same and used as above described. In a sense, each fastener of this kind is the same as two of those shown in Fig. 6, left open at their outer ends as at 24 and integrally connected at right angles and hence stopped or blocked at their inner ends at 25. The tangs 23 are cut from the blank 26 as shown in Fig. 15, and their manner of attachment to the rug need not be further explained. The corner sockets shown in Figs. 16 and 17 also have tubular bodies 22' open at their outer ends as at 24' and connected by a right angle 25' at their inner ends; but here the blank 26' of Fig. 17 is stamped so as to produce side ears 27 having eyes 28, and must be formed with wings 25'' which are upbent and turned over the body as seen in Fig. 16 to produce the cup-shaped stop for the extremities of the strips as will be understood. Here again, the manner of attaching this device to the rug need not be amplified.

The double socket shown in Fig. 9 has a tubular body 32 open at both ends as at 34 and provided with two sets of tangs 33 as shown. It is by preference about double the length of the socket shown in Fig. 6, and in Fig. 9 it is shown as provided with a stop midway between its ends which consists of two additional tangs 35 whose extremities are turned down into the bore of the body so as to interrupt the same, and the inner ends of the strips come against this stop as seen in Fig. 12. The double socket illustrated in Fig. 10 also has a tubular body 42 with open extremities 44, but this construction illustrates the use of the ears 47 having eyes 48 which are stitched beneath the rug in a manner which will be clear. The stop 45 in this case is a hump struck up from the material 46 forming the lower side of the body, and its use is illustrated in Fig. 13.

Thus it will be seen that I have produced a rug stiffener comprising only the socket members and the strip members, but just what sockets will be used in any particular case must be left to the customer or will be controlled by conditions. In Fig. 2 I have shown stiffeners around the four sides of a rug, and these will doubtless be used where the rug is large; perhaps even a double row of stiffeners might be carried around the four edges of the rug if the latter were rather flexible or there were children or infirm people in the household liable to injury in case the rug slipped. I do not limit myself to the precise use of this device.

Also as above suggested, I have shown and described only two forms of the fastening devices although others might be substituted without departing from the principle of the invention. When in place the stiffener is entirely concealed by the body of the rug, and the latter is held out flat upon the floor with the resultant advantages set forth above. When it is desired to clean the rug, it is turned over and each stretch or length of strip is sprung away from the rug so that its extremities may be withdrawn from the sockets into which they have been inserted, after which the rug can be rolled or folded, carried to the place where it is to be beaten or cleaned, and returned; then the strips are re-inserted, and the rug finally inverted and placed upon the floor. When it becomes necessary or desirable to send the rug to the cleaners it may be wise to detach the socket members entirely, and this can be done by straightening out the tangs or cutting the stitches as any housewife will know. I would suggest this course because in steam-cleaning a rug the socket-members might be torn or lost off or might become rusted; and moreover it often occurs that when a rug is steam-cleaned it is shrunken or stretched slightly along one or more sides, and the reattachment of this stiffener would therefore become imperative anyway. It will hardly be necessary to advise the housewife to guard against securing the sockets in such position or cutting the strips in such length that the rug will show a forced or stretched appearance on its upper side, and on the other hand the lengths should not be cut so short that their extremities will become accidentally disengaged from the sockets as when the rugs are undergoing their ordinary everyday use.

What is claimed as new is:

1. The herein described rug stiffener comprising stiffening strips, a plurality of sockets each adapted to receive one end of one strip and having an internal stop against which it abuts, other sockets having tubular bodies through which said strips pass freely, and means for securing all the sockets to the under side of a rug.

2. A rug stiffener comprising four right-angular corner sockets and a stop within each near its angle, other sockets disposed between the right-angular sockets, means for securing all the sockets to the under side of a rug, and stiffening strips whereof each has one end mounted in a corner socket against the stop therein and its other end mounted in another socket.

3. A rug stiffener comprising stiffening strips, and a set of right-angular metal sockets whereof each has a flattened tubular body with open ends adapted to receive the extremities of two of said strips, the lower side of the body being provided with means whereby the socket may be attached to a rug, and the body also having a stop for the inner ends of said strips.

4. A rug stiffener comprising stiffening strips, and a plurality of metal sockets whereof each has a flattened tubular body with open ends adapted to receive the extremities of two of said strips and provided between its ends with a stop for the purpose set forth, and fastening devices connected with said body for attaching it to the under side of a rug.

5. A rug stiffener comprising stiffening strips, and a set of right-angular metal sockets whereof each has a flattened tubular body with open ends adapted to receive the extremities of two of said strips, the lower side of the body being stamped with three ears pierced with eyes whereby the socket may be attached to the rug, and the body also having a stop for the inner ends of said strips.

6. A rug stiffener comprising stiffening strips, and a set of right-angular metal sockets whereof each has a flattened tubular body with open ends adapted to receive the extremities of two of said strips, the lower side of the body being stamped with ears pierced with eyes whereby the socket may be attached to the rug, and the body at its angle having wings which are up-bent into a stop for the extremities of said strips.

In testimony whereof I have hereunto set my hand in presence of two subscribing witnesses.

WALKER A. SCOTT.

Witnesses:
ANDREW J. FAY,
GEO. R. LITTLE.

Copies of this patent may be obtained for five cents each, by addressing the "Commissioner of Patents, Washington, D. C."